United States Patent
Bastos et al.

(10) Patent No.: US 6,975,329 B2
(45) Date of Patent: Dec. 13, 2005

(54) DEPTH-OF-FIELD EFFECTS USING TEXTURE LOOKUP

(75) Inventors: Rui M. Bastos, Santa Clara, CA (US); Stephen D. Lew, Sunnyvale, CA (US); Curtis A. Beeson, Fremont, CA (US); Joseph E. Demers, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 206 days.

(21) Appl. No.: 10/314,877

(22) Filed: Dec. 9, 2002

(65) Prior Publication Data

US 2004/0109004 A1 Jun. 10, 2004

(51) Int. Cl.[7] ............................. G09G 5/00; G06T 15/40
(52) U.S. Cl. ........................................ 345/587; 345/422
(58) Field of Search ............................. 345/587, 582, 345/581, 422, 421, 430

(56) References Cited

U.S. PATENT DOCUMENTS

| | | | |
|---|---|---|---|
| 5,877,771 A * | 3/1999 | Drebin et al. | 345/586 |
| 6,567,095 B2 * | 5/2003 | Wood | 345/587 |
| 6,664,958 B1 * | 12/2003 | Leather et al. | 345/422 |
| 6,766,281 B1 * | 7/2004 | Vijayakumar et al. | 702/190 |

* cited by examiner

Primary Examiner—Mattthew C. Bella
Assistant Examiner—Aaron M. Richer
(74) Attorney, Agent, or Firm—Moser Patterson & Sheridan LLP (57) ABSTRACT

A graphical processing unit (GPU) and methods for rendering a three-dimensional (3D) scene generated in a field of view having in-focus and out-of-focus regions on a two-dimensional (2D) screen region of pixels are described. One method includes initially rendering the scene to create color and depth texture maps and creating mip-map layers for the color texture map. The method further comprises subsequently rendering the scene by, for each pixel: creating a mip-map layer selection value as a function of a depth of the pixel from the depth texture map, generating a color value by interpolation using color values from at least one of the mip-map layers chosen according to the mip-map layer selection value, and setting a color of the pixel to the generated color texture.

40 Claims, 10 Drawing Sheets

BEFORE BLURRING

FIG. 8A

INCORRECT BLURRING

FIG. 8B

CORRECT BLURRING

DEPTH-OF-FIELD EFFECTS USING TEXTURE LOOKUP

BACKGROUND OF THE INVENTION

1. Field of the Invention

One or more aspects of the present invention generally relate to computer graphics and, more particularly, to rendering three-dimensional (3D) scenes with depth-of-field correction.

2. Description of the Related Art

In general, three-dimensional (3D) computer graphics is the art and science of generating 3D scenes on a two-dimensional (2D) computer screen. In a 3D animation, a sequence of images is displayed, giving the appearance of motion in three-dimensional space. Interactive 3D computer graphics allows a user to change viewpoint or geometry in real-time, thereby requiring the graphics system to create new images. Conventionally, the higher the number of images that are displayed per second, commonly referred to as the frame rate, the smoother the animation will appear but the more processing power and system bandwidth is required. For example, the human eye may detect new images coming onto the screen at frame rates less than 30 frames per second (fps). Several factors may affect the actual frame rate on a computer graphics system, such as the number of pixels on the screen. Generally, higher frame rates are possible with a lower number of pixels, but visually perceptible image quality may suffer.

While the number of pixels and frame rate is important in determining graphics system performance, visual quality of the image generated may be equally important. For example, an image on a 2D screen with a high pixel density may still appear unrealistic if all the objects appearing in the scene are in focus. The unrealistic appearance is due to an incorrect (or lack of) depth-of-field effect of the image. Depth of field generally refers to the distance range (i.e., an in-focus range) from a viewpoint within which objects in an image look sharp. In general, depth-of-field corrections attempt to blur objects or areas of an image that are either closer or farther away from a particular focal point.

Figure 1:
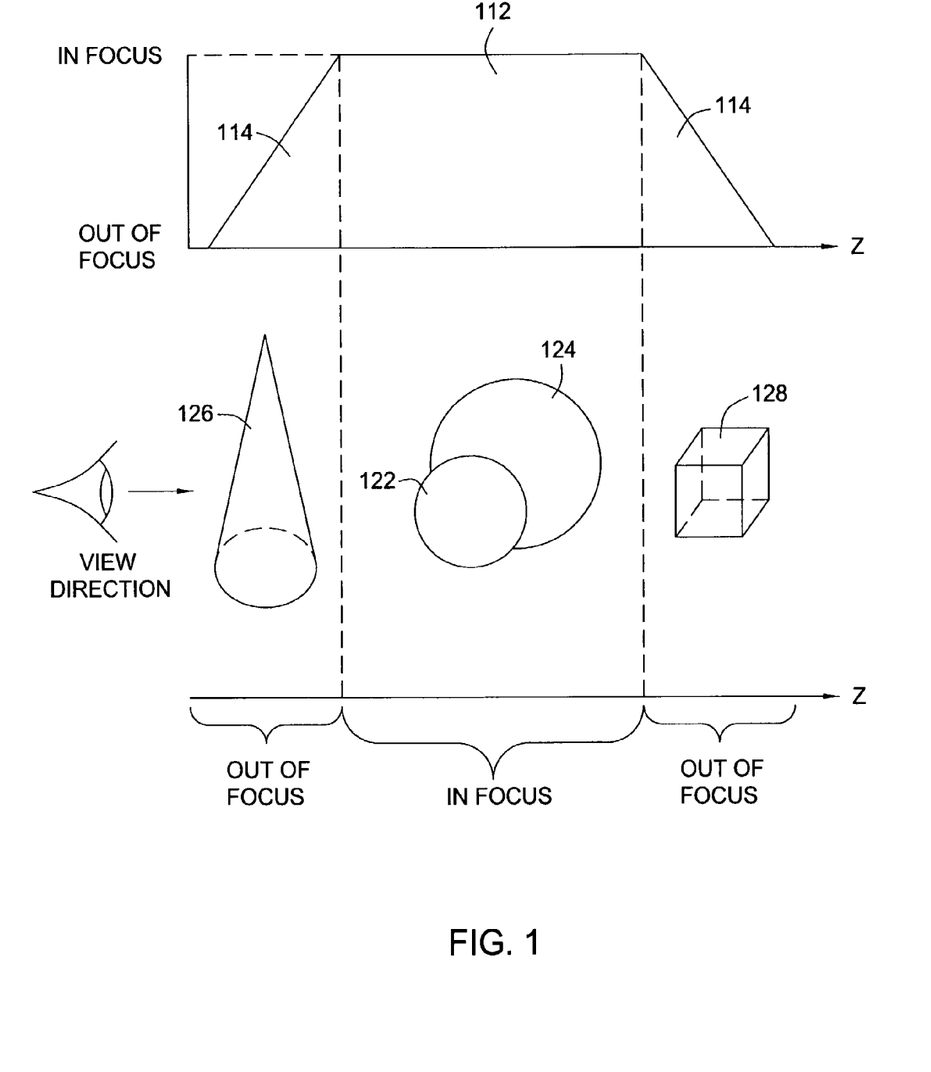
FIG. 1 illustrates an exemplary field of view having an in-focus region and out-of-focus regions.

FIG. 1 illustrates an exemplary field of view 100 having an in-focus region 112 and out-of-focus regions 114 in the foreground and background. As used herein, the terms foreground and background refer to regions or objects nearer to or farther from, respectively, a viewpoint relative to a reference region or object. As illustrated, out-of-focus regions 114 typically transition from in-focus to out-of-focus. In general, the greater the distance from the in-focus region 112, the less sharp an object will appear. In other words, an image of the field of view 100 displayed on a 2D screen may appear more realistic if in-focus objects 122 and 124 appear sharp, a slightly out-of-focus object 126 appears slightly blurred and an out-of-focus object 128 appears very blurred. Accordingly, depth-of-field corrections applied to a 3D scene rendered on a 2D screen may enhance the quality of the image by adding realism.

Traditional approaches to performing depth-of-field corrections on a 3D scene typically perturb (i.e., jitter) a viewpoint multiple times, rendering the scene for each perturbation. The rendered scenes for each of the perturbations are accumulated in an accumulation buffer. After all the perturbations, the final scene in the accumulation buffer (possibly after some filtering) may be transferred to a frame buffer. The concept is that, by perturbing the viewpoint, objects that are in focus should remain in focus, while objects that are out of focus should change with each perturbation. The final accumulated values for pixels of out-of-focus objects should be a sum of the value of neighboring pixels offset by a distance determined by the perturbations. Accordingly, out-of-focus objects should appear blurry in the final scene. Another approach to depth of field effects is achieved by randomizing sample locations, as described in U.S. Pat. No. 4,897,806.

However, all these previous approaches conventionally require that the scene be rendered numerous times (or, the rendering to have many more samples per pixel) to achieve acceptable image quality. As a result, the processing time required to achieve acceptable image quality using these approaches may lower the frame rate of the graphics system to an unacceptable level. Therefore, these conventional approaches to depth-of-field corrections may be unsuitable for real time 3D graphics processing systems.

Accordingly, a need exists for improved rendering of 3D scenes with depth-of-field effects, namely, where less processing time is used.

SUMMARY

The present invention generally provides methods and apparatus for rendering a three-dimensional (3D) scene generated in a field of view having in-focus and out-of-focus regions.

An aspect of the present invention includes initially rendering the scene to create color and depth texture maps and creating mip-map layers for the color texture map. The final scene is subsequently generated by, for each pixel: creating a mip-map layer selection value as a function of a depth of the pixel from the depth texture map, generating a color value by interpolation using color values from at least one of the mip-map layers chosen according to the mip-map layer selection value, and setting a color of the pixel to the generated color value.

For some embodiments, a filtering function may be applied to filter depth values of the depth texture map. For some embodiments, one or more actions which may be included are: creating a set of texture coordinate tuples, generating a color value for each texture coordinate tuple by interpolation using color values from at least one of the mip-map layers chosen according to the mip-map layer selection value, and generating a color value for the pixel by blending together the color values generated for each texture coordinate tuple.

One or more other aspects of the present invention include providing an application program interface (API) to interface with a graphics processor, receiving the 3D scene by the API from an application program, and passing the 3D scene to the graphics processor from the API, wherein the graphics processor is configured to initially render the scene to create color and depth texture maps and create mip-map layers for the color texture map. The graphics processor is further configured to subsequently generate the final scene by, for each pixel: creating a mip-map layer selection value as a function of a depth of the pixel from the depth texture map, generating a color value by interpolation using color textures from at least one of the created mip-map layers chosen according to the mip-map layer selection value, and setting a color of the pixel to the generated color value.

Still other aspects of the present invention provide graphical processing units (GPUs) for rendering a three-dimensional (3D) scene on a two-dimensional (2D) screen region of pixels. The GPUs may include a graphics processor configured to initially render a scene to create color and depth texture maps, and mip-map layers for the color texture map. The GPUs may also include a shader unit configured to subsequently render the scene by, for each pixel: creating a mip-map layer selection value as a function of a depth of the pixel from the depth texture map, generating a color value by interpolation using color values from at least one of the mip-map layers chosen according to the mip-map layer selection value, and setting a color of the pixel to the generated color value.

Still other aspects of the present invention provide a computer-readable medium containing a program which, when executed by a processor, performs operations for rendering a three-dimensional (3D) scene generated in a field of view having in-focus and out-of-focus regions on a two-dimensional (2D) screen region of pixels. The operations generally include initially rendering the scene to create a color texture map and a depth texture map, and creating mip-map layers for the color texture map, and subsequently rendering the scene by, for each pixel, creating a mip-map layer selection value as a function of a depth of the pixel from the depth texture map, generating a color value by interpolation using color values from at least one of the mip-map layers chosen according to the mip-map layer selection value, and setting a color of the pixel to the generated color value.

Still other aspects of the present invention provide a computer system containing a processor and a storage medium containing a program which, when executed by the processor, performs operations for rendering a three-dimensional (3D) scene generated in a field of view having in-focus and out-of-focus regions on a two-dimensional (2D) screen region of pixels. The operations generally include initially rendering the scene to create a color texture map and a depth texture map, and creating mip-map layers for the color texture map, and subsequently rendering the scene by, for each pixel, creating a mip-map layer selection value as a function of a depth of the pixel from the depth texture map, generating a color value by interpolation using color values from at least one of the mip-map layers chosen according to the mip-map layer selection value, and setting a color of the pixel to the generated color value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides for performing depth-of-field corrections when rendering a three-dimensional (3D) scene on a two-dimensional (2D) screen of pixels. Included are capturing depth and color values for each pixel as textures in a first pass of rendering the 3D scene, and subsequently blurring out-of-focus portions of the scene based on captured depth values for the pixels in a second pass of rendering the object. For different embodiments, different operations may be performed in either hardware or software or a combination thereof.

Figure 2:
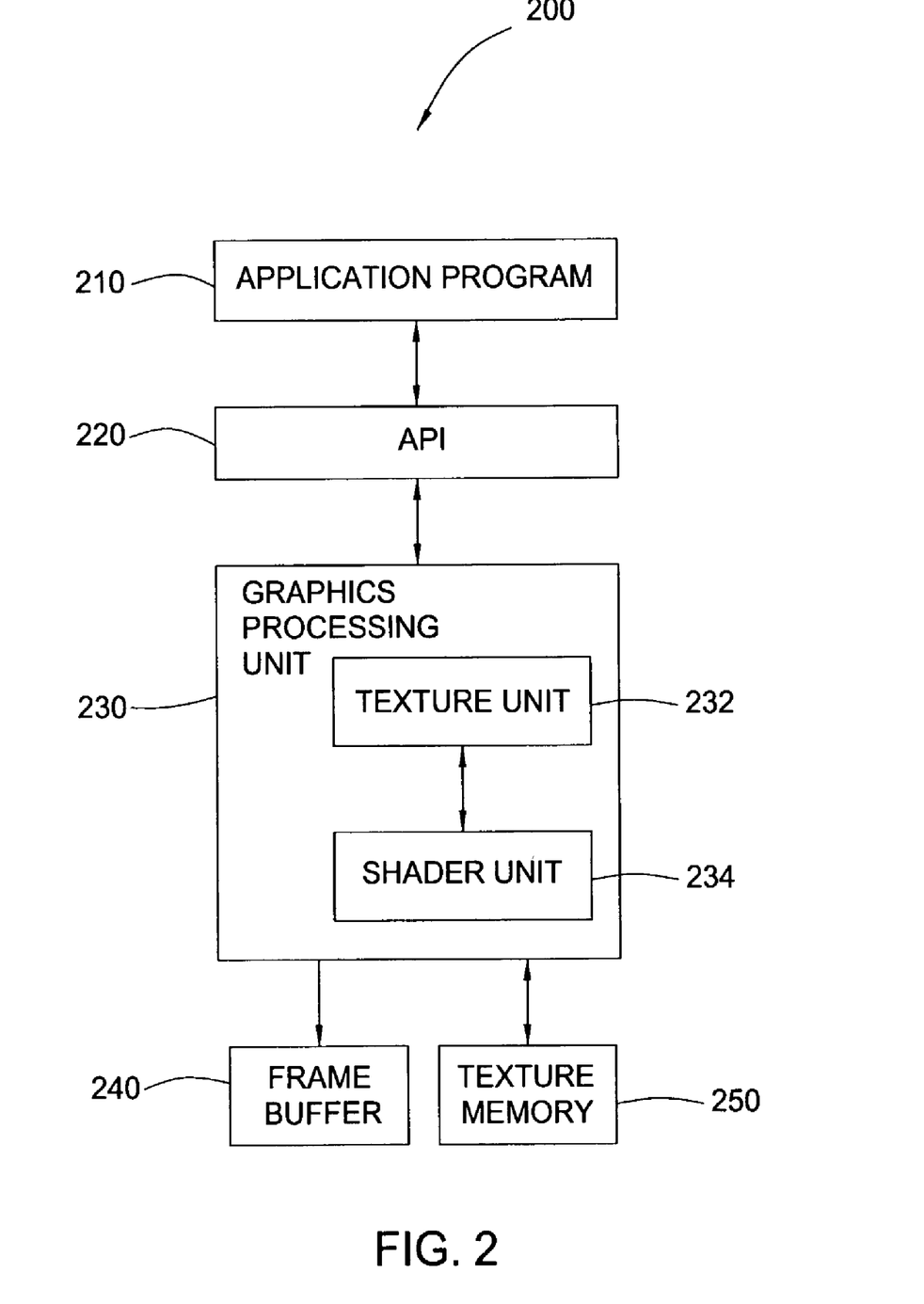
FIG. 2 illustrates an exemplary graphics system.

FIG. 2 illustrates a schematic block diagram of a graphics system 200 that may be used to practice one or more aspects of the present invention. The graphics system 200 generally includes an application program 210, application program interface 220, a graphics processing unit (GPU) 230, and a frame buffer 240. The application program 210 may generate a graphic image to be displayed on a display. The API 220 serves as an interface between the application program 210 and the GPU 230. The API 210 may be any of a variety of APIs, including well-known APIs, such as OpenGL or Direct3D, or a proprietary API. The application program 210 may pass a graphic image to the GPU 230 via the API 220 for processing. The GPU 230 processes the graphic image and outputs a rendered image as a 2D set of pixels to a frame buffer 240 for display.

For some embodiments, the GPU 230 may be a pipelined GPU, such as the GeForce® line of pipelined GPUs available from nVidia of Santa Clara, Calif. As illustrated, the GPU 230 may include at least one texture unit 232 and at least one shader unit 234, which may be separate components or may each be part of a graphics processor. In general, the texture unit 232 may receive texture coordinates for individual pixel fragments, access texture values from texture maps stored in a texture memory 250, and perform various levels of filtering on the texture values. Texture memory 250 may be part of a same memory used for the frame buffer 240, or may be separate memory dedicated to the texture unit 232. The shader unit 234 may access texture values from the texture memory 250, combine the texture values and/or perform additional filtering operations to generate a final color value for a pixel that is eventually written to the frame buffer 240.

For some embodiments, the shader unit 234 may be designed as a programmable engine, for example, that may execute a set of instructions (a "pixel program"), which may be passed through the API 220. A pixel program may cause the shader unit 234 to perform the operations described below. Alternatively, the operations described below may be implemented in hardware as part of the texture unit 232, as another part of the GPU 230, or external to the GPU 230.

One advantage to a programmable shader unit 234 is that an application programmer may be able to implement various functions for generating scenes with different fields of view, which may be suitable for different applications. For example, the field of view 100 of FIG. 1 illustrates just one fields of view that may be implemented by the shader unit 234. Other exemplary fields of view are illustrated in FIGS. 3A–3D.

Figure 3A:
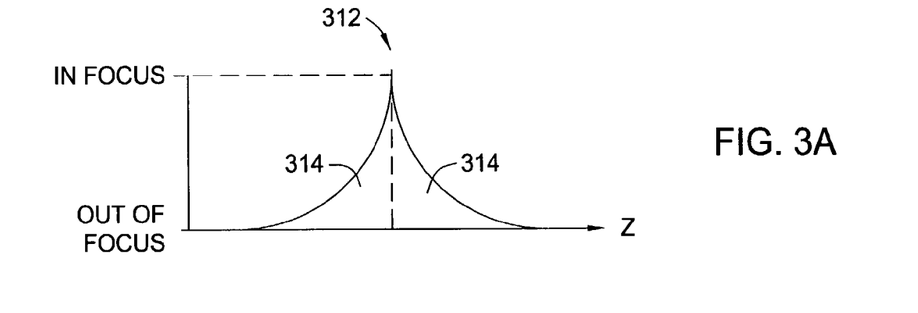
FIGS. 3A–3D illustrate additional fields of view having at least one in-focus region and out-of-focus regions.
Figure 3B:
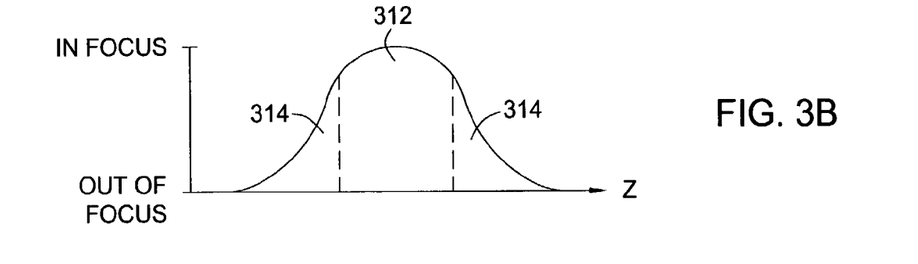
Figure 3C:
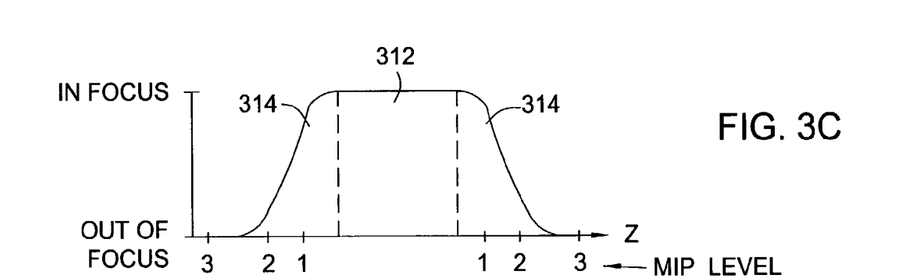

FIG. 3A, illustrates a field of view analogous to that of a lens having a narrow focal region (i.e., a plane) 312 and out-of-focus regions 314 falling off exponentially. FIG. 3B illustrates a field of view with a focal region 312 surrounded by out-of focus regions 314 parabolically transitioning out-of-focus. FIG. 3C illustrates a field of view with a large in-focus region 312, and exponentially decaying out-of-focus regions 314.

Figure 3D:
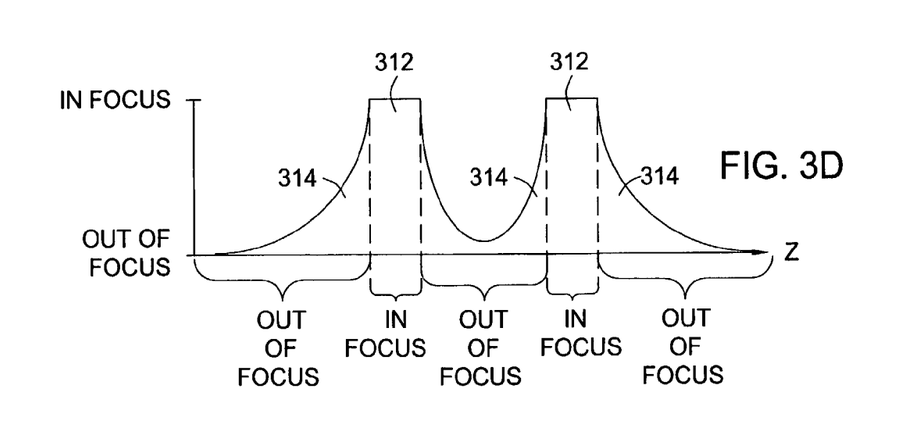

Different fields of view may be utilized, for example, to draw a viewer's attention to a particular in-focus object. For example, in-focus regions and out of focus regions may be dynamically changed to keep a selected object (e.g., a character in a computer game, an advertiser's product, etc.) in-focus. One or more corrections for depth-of-field correction may be utilized to keep the selected object in focus while blurring the rest of the scene, drawing a viewer's attention to the selected object. Further, as illustrated in FIG. 3D, a field of view may have one or more in-focus regions 312. More than one in-focus region 312 may be useful, for example, in applications where tracking particular objects at different depths, while maintaining a high level of detail, is important.

Figure 4:
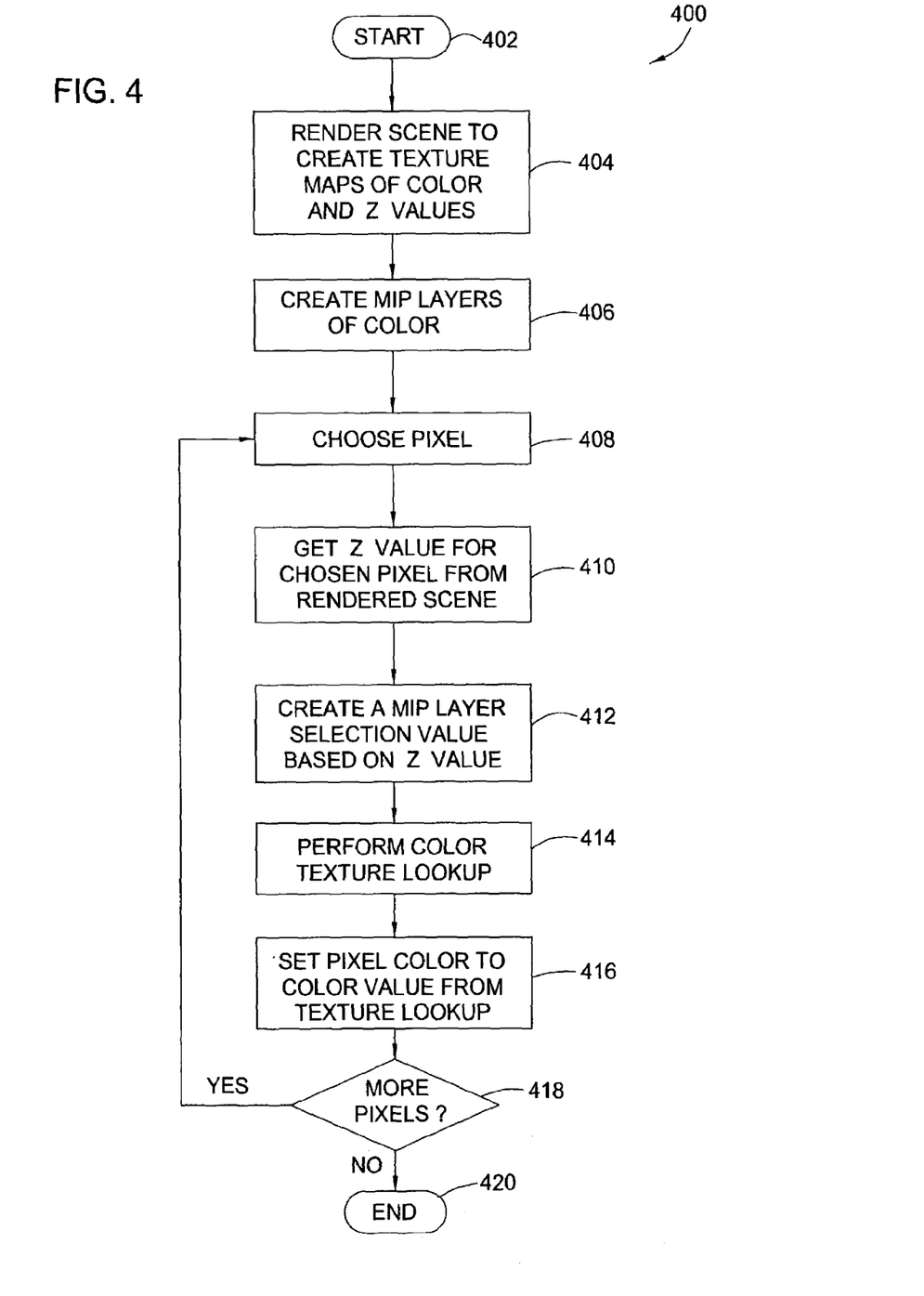
FIG. 4 illustrates exemplary operations for making depth-of-field corrections according to one or more aspects of the present invention.

FIG. 4 is a flow diagram illustrating exemplary operations of a process 400 for rendering a three-dimensional (3D) scene generated in a field of view having in-focus and out-of-focus regions on a two-dimensional (2D) screen region of pixels. This may include making depth-of-field corrections using depth values stored as textures. The screen region of pixels may be the entire screen or just a portion of the screen. For example, the screen region may be a portion of the screen bound, for example, by a rectangle, inside of which there is blurrable geometry.

As previously described, operations of the rendering process 400 may be implemented in software (e.g., as part of the application program 210), in hardware (e.g., as part of the GPU 230), and/or as a pixel program executed by the shader unit 234. Accordingly, while the following description of the rendering process 400 may refer to the elements of FIG. 2, other hardware and software elements may also be capable of performing the operations of the rendering process 400.

The rendering process 400 begins at step 402. At step 404, a scene is rendered to create a texture map of colors and a texture map of depth values (i.e., z-values) for each pixel. For example, the scene may be rendered into a color buffer and a depth buffer. The color buffer and depth buffer may then be captured as color and depth texture maps, for example, in texture buffers of texture unit 232 of FIG. 1.

At step 406, mip layers (mip maps) are created for the texture map of colors. The mip maps may be created using a filter kernel of any suitable size and shape. As used herein, a filter kernel refers to a shape of an area of a texture map that includes texture values to be included in a filtering function (i.e., a filtering function with a 2×2 filter kernel would typically perform a weighted blending of 4 texture values together). For some embodiments, the different mip maps may be created using a traditional 2×2 filter kernel, blending four texture values from one mip map to create a single texture value on the next layer mip map. Each mip-map layer represents a level of blurriness of the original in-focus scene.

However, for other embodiments, symmetrical filter kernels larger than 2×2 texels may be used to generate the mip layers in an effort to minimize visible discontinuities in the blurred regions. For example, a filter kernel of 4×4, 6×6 or 8×8 may be used to generate the mip-maps. The visible discontinuities arise from low-order (bilinear) interpolation of low-resolution mip-map layers into higher-resolution regions on the final scene. The slope discontinuities caused by the interpolation of texel values can cause visible artifacts (discontinuities), due to magnification of a region on a low-resolution mip layer onto a larger region on the final scene. A larger filter kernel may effectively average a larger area of texels, creating a smoother transition between texels, so the discontinuities aren't as visible on the displayed pixels.

For some embodiments, the mip-map layer selection values may be generated by passing the texture unit 232 a value corresponding to a desired spacing of texture coordinates (e.g., ds and dt) for the mip map. For example, a one-dimensional spacing of texture coordinates for a given mip layer N may be $2^N/S$, where S may be the number of pixels along the corresponding dimension on the mip-mapped texture/screen. For example, this value may be passed to the texture unit 232, which may generate a mip-map selection value having the specified change in texture coordinates based on the depth texture map. For other embodiments, a texture unit may generate a mip-map layer selection value based on an integer layer number (i.e., the mip layer N).

The operations of steps 404 and 406 may be considered a first rendering pass to perform pre-filtering operations. Steps 408–420 correspond to iterative (i.e., looped) operations performed for each pixel during a second rendering pass. Operations of steps 408–420 may be performed on a number of pixels in a parallel manner. The second rendering pass of steps 408–420 may be thought of as a "2½-D" rendering: a 2D rendering based on depth values (i.e., a third dimension z).

At step 408, a pixel is chosen. At step 410 a z-value for the pixel (captured at step 402) is returned from the depth texture map for the chosen pixel. At step 412, a mip layer selection value is generated based on the z-value for the pixel. Any suitable algorithm may be performed to generate the mip layer selection value. In general, the greater the distance the z-value for the chosen pixel is from an in-focus z-value, the higher the mip layer selection value (i.e., the lower the resolution).

However, as illustrated in FIGS. 3A–D, various fields of view may be defined by different functions. Accordingly, the mip layer selection value may be determined by similar functions, or by the same functions. As illustrated in FIG. 3C, the mip layer selection values may be mapped directly to the z-axis. For example, z-values corresponding to the in-focus region 312 may correspond to a mip layer selection value of 0, while z-values corresponding to the out-of-focus regions 314 may increase from zero accordingly. Therefore, creating a mip-map layer selection value as a function of a depth value may be reduced to looking up a value from a lookup table or map.

At step 414 a texture value for color is looked up based on the mip layer selection value. For example, a texture-coordinate tuple for one or more mip layers may be calculated for the chosen pixel, and passed to the texture unit 232. (As used herein, a tuple generally refers to an ordered set of values, such as s and t texture coordinates.) For some embodiments, the texture unit 232 may return a texture value that is a bilinear interpolation of texel values surrounding the texture-coordinate tuple on the selected mip map. Further, if the mip layer selection value is not an integer (i.e., the mip map selection value is between mip layers), the texture value returned from the texture lookup may be a trilinear interpolation of texel values from mip-map layers above and below the mip layer selection value. For example, if the mip layer selection value is 3.9, the texture lookup may return a value that is a trilinear interpolation of texel values from mip layer 3 and mip layer 4, which corresponds to the linear interpolation of the bilinear interpolations on each of the surrounding mip-map layers. For some embodiments, bilinear texture values returned from adjacent mip layers may be blended together with a blending function that gives greater weight to a texture value from a mip layer closest to the mip layer selection value.

At step 416 the pixel color is set to the color texture value returned from the texture lookup. At step 418, if more pixels remain, steps 408–416 are repeated. If there are no more pixels at step 418, the routine is terminated at step 420. For example, the final pixel values may be written to a page buffer to be displayed on a screen. Thus, by varying the level of mip map (or mip maps) used to generate a final color value for each pixel, based on its depth value, out-of-focus objects should appear blurred in the final screen image of the scene.

MULTIPLE TEXTURE LOOKUPS

As previously described, for some embodiments, symmetrical filter kernels larger in size than 2×2 texels may be used to generate the mip layers in an effort to avoid visible discontinuity artifacts. For some embodiments, a similar but even higher quality result may be obtained by blending texture values from multiple texture lookups using a set of texture-coordinate tuples. In other words, while a smaller filter kernel size may be used to generate the mip maps, a larger area of textures may be sampled to generate the final pixel color, effectively compensating for the smaller filter kernel size. An advantage to this approach may be an improvement in image quality (smoothness) of the blurred regions. Using conventional mip-mapping techniques, magnification of low-resolution layers onto large regions of the final scene may lead to discontinuities, even if the layers are pre-blurred with wide filter kernels. Using multiple texture lookups may reduce or eliminate the problem by performing interpolation (filtering) of higher order than conventional bilinear interpolation.

Figure 5:
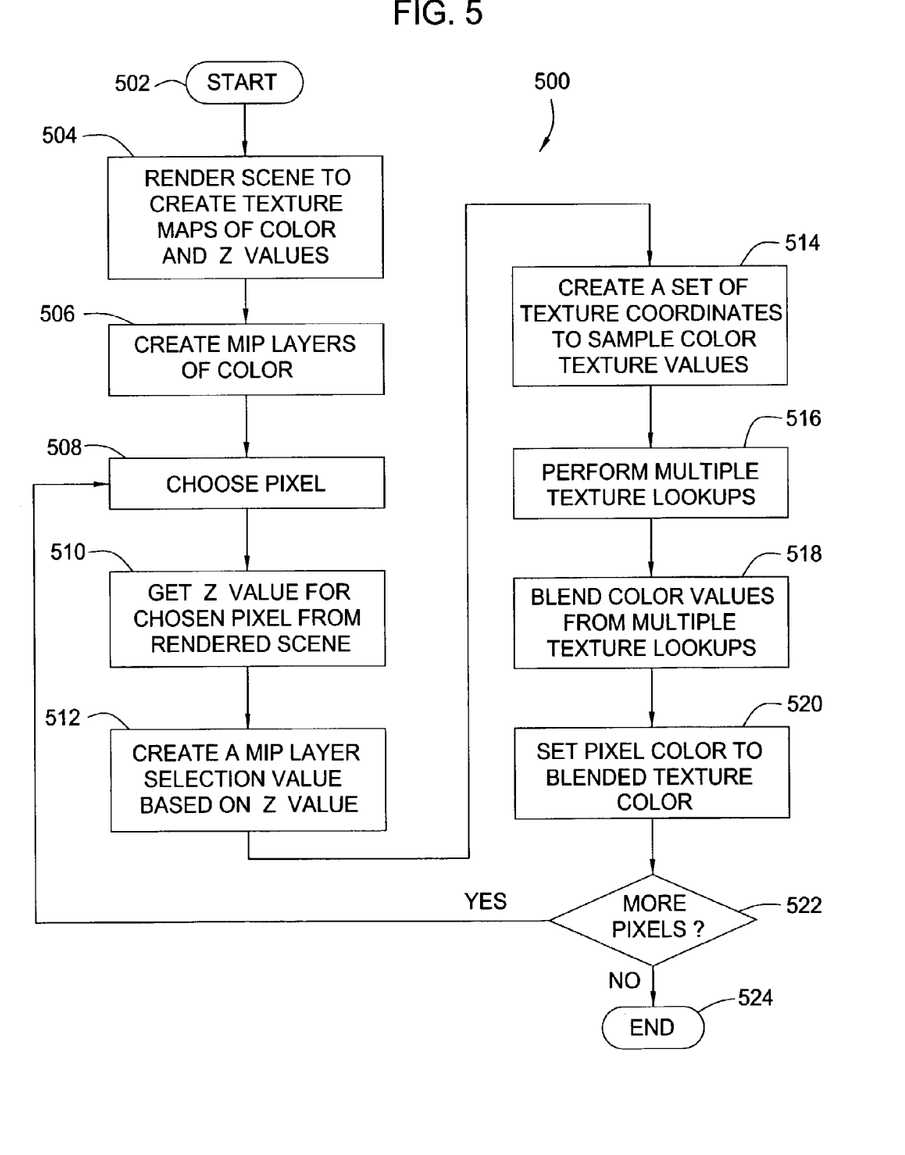
FIG. 5 illustrates exemplary operations for making depth-of-field corrections according to one or more aspects of the present invention.

FIG. 5 illustrates exemplary operations of a method for depth-of-field corrections that performs multiple texture lookups using a set of texture-coordinate tuples. As illustrated, steps 502–512 of FIG. 5 mirror steps 402–412 of FIG. 4. However, rather than perform a texture lookup using a single texture coordinate, multiple texture lookups are performed at step 516, using a set of texture-coordinate tuples created at step 514. For each of the multiple texture lookups, a texture value may be returned that is a trilinear interpolation of texture values from adjacent mip maps above and beyond the mip layer selection value, as previously described.

At step 518, the texture values returned from the multiple texture lookups are blended using any suitable blending function. At step 520, the pixel color is set to the blended texture color value. At step 522, if more pixels remain, steps 508–520 are repeated. If there are no more pixels at step 522, the routine is terminated at step 524. Thus, by performing multiple texture lookups, final pixel values may be blended as if a larger kernel size were used to generate the mip maps, which may improve the smoothness of the resulting blurred region.

The set of texture-coordinate tuples may be created from a single texture coordinate. For example, each of the set of texture-coordinate tuples may be offset from the single texture-coordinate tuple by a fixed offset. The set of texture-coordinate tuples may form a symmetrical pattern around the single texture coordinate. For example, as illustrated in FIGS. 6A–6D, a set of offset texture coordinates 620 may form a diamond pattern around an initial single texture coordinate 610. As illustrated by the dashed arrows in FIG. 6A, for each texture coordinate 610 and 620, surrounding texels 630 may be blended together to create a texture value returned from a texture lookup.

Figure 6A:
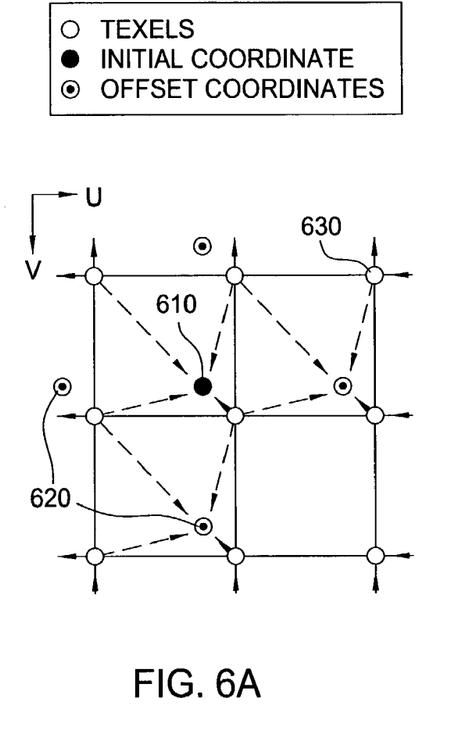
FIGS. 6A–6D illustrate exemplary patterns of texture coordinates according to one or more aspects of the present invention.
Figure 6B:
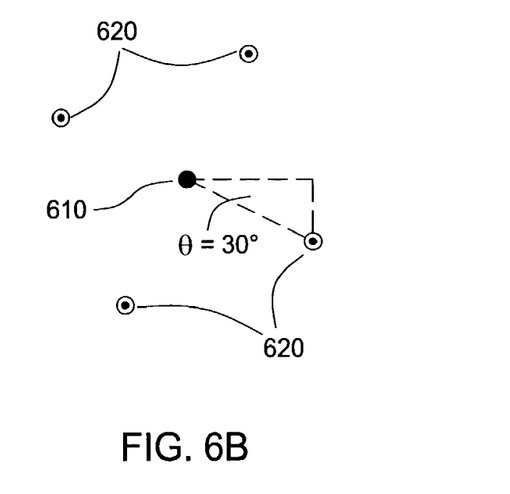
Figure 6C:
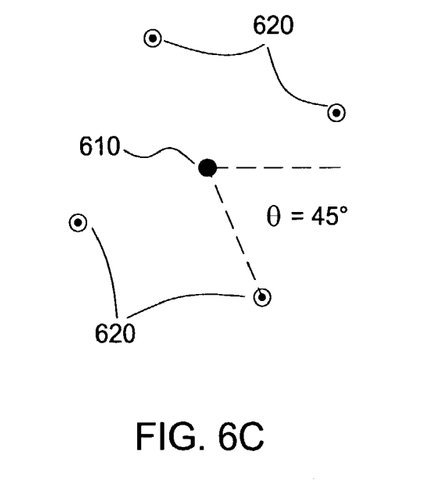
Figure 6D:
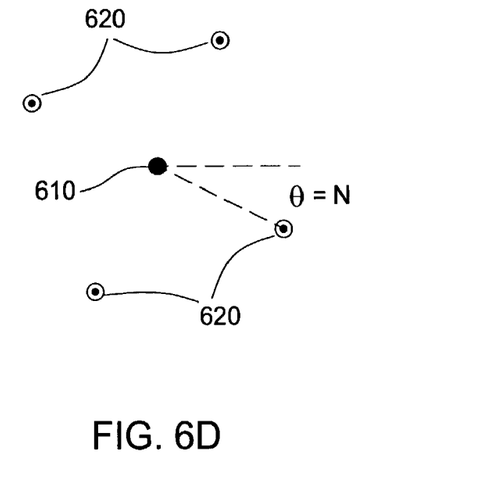

According to some aspects, the distance between the offset texture coordinates 620 (i.e., the offset from the initial texture coordinate 610) may be chosen according to the mip layer selection value. As illustrated, for different embodiments, the diamond pattern may be rotated around the initial texture coordinate 610 at different angles ($\Theta$) of rotation, while maintaining a constant offset. The angle $\Theta$ may be 0° (FIG. 6A), 30° (FIG. 6B), 45° (FIG. 6C), or an arbitrary angle N (FIG. 6D). It should be noted, however, that the exemplary patterns of FIGS. 6A–6D are exemplary only, and that the set of texture coordinates may take on various shapes.

FILTERING DEPTH VALUES

Figure 7:
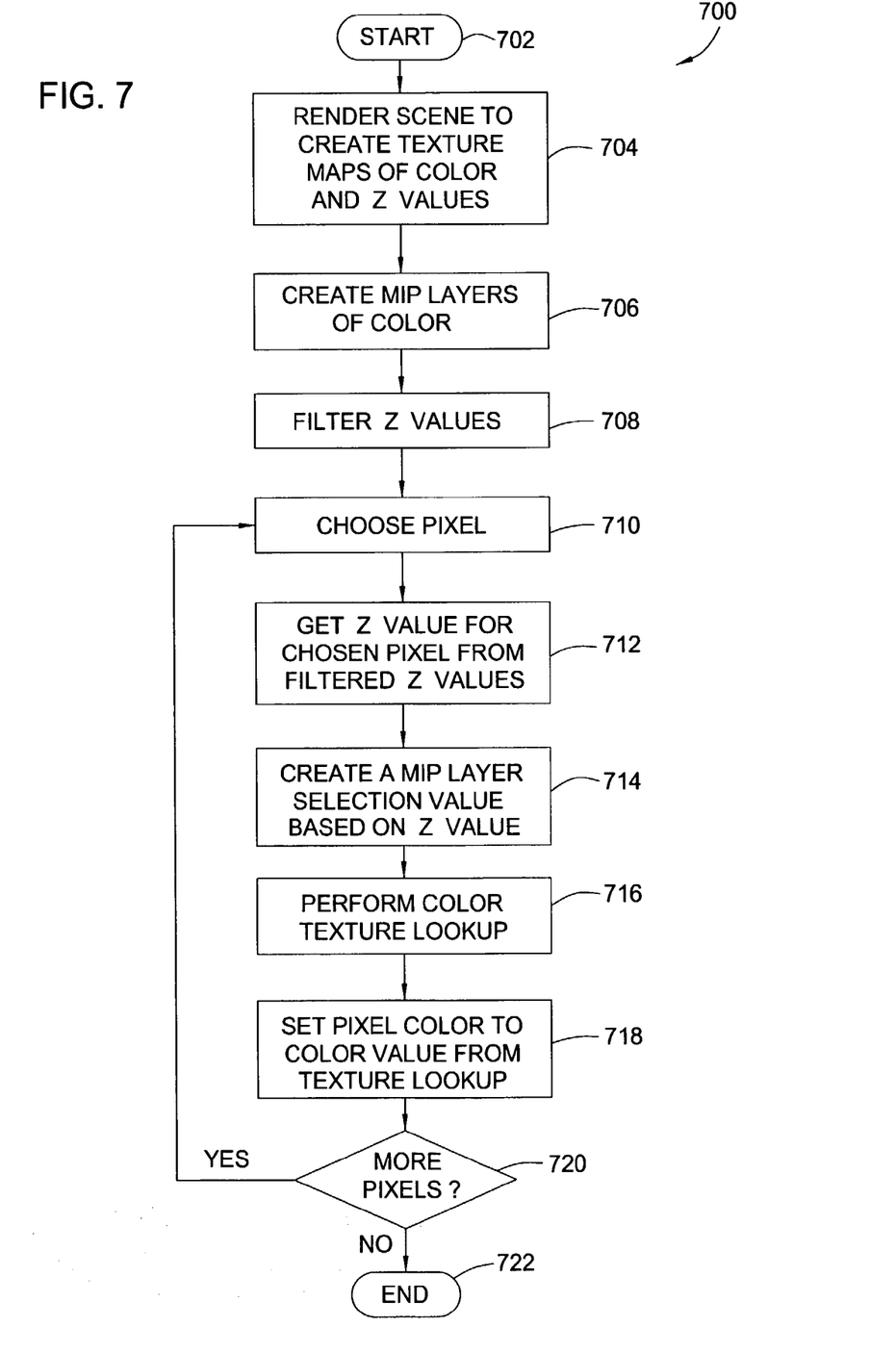
FIG. 7 illustrates exemplary operations for making depth-of-field corrections according to one or more aspects of the present invention.

Depth values in the depth texture map may be filtered prior to rendering the final scene. For example, FIG. 7 illustrates operations of a method 700 in which depth values (z-values) are filtered at step 708. The remaining operations of FIG. 7 are similar to the operations of the method 400 of FIG. 4, except that the filtered depth values are used at step 714 to create a mip layer selection value for the chosen pixel. Any suitable filtering function may be used to filter the depth values. For example, as previously described with reference to the mip-map layers, the filtering function applied to the depth values may use a symmetrical kernel, larger in size than 2×2 texels.

Filtering the depth values prior to rendering the final scene may provide for smoother transitions from foreground objects to background objects, by effectively pushing foreground objects into the background and pulling background objects into the foreground. For some embodiments, filtering the depth values may reduce or eliminate a visible artifact that may occur when performing depth-of-field corrections on a scene with an out-of focus foreground object occluding (i.e., blocks the view of) an in-focus background object.

Figure 8A:
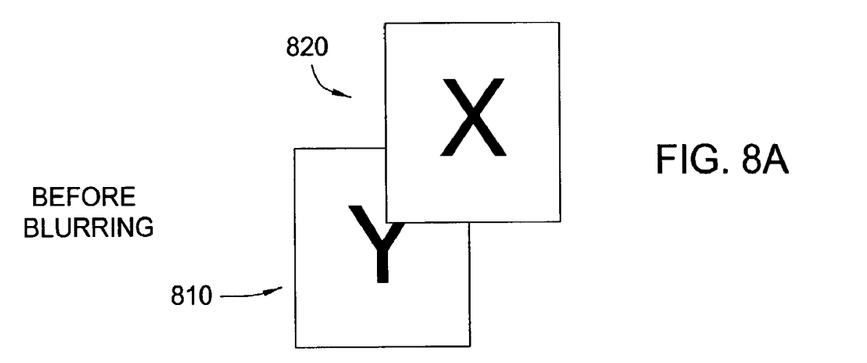
FIGS. 8A–8C illustrate an out-of-focus foreground object occluding an in-focus background object.
Figure 8B:
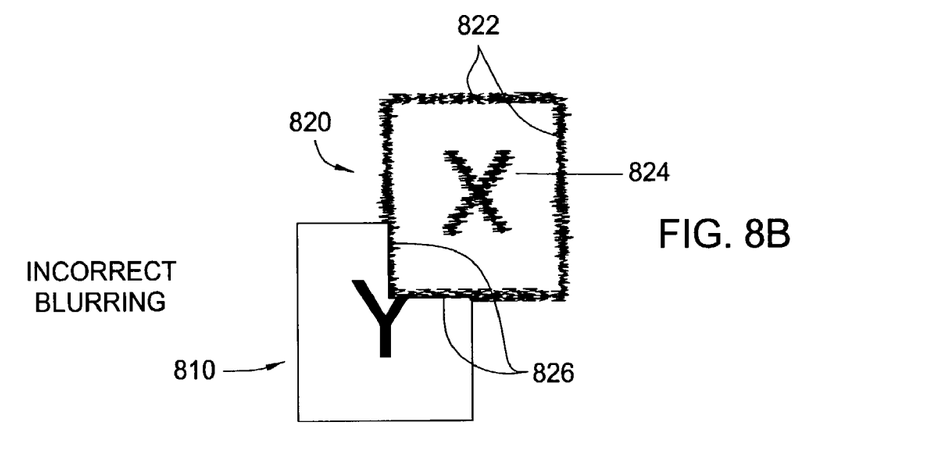

The artifact may be described with reference to FIGS. 8A–8C, which illustrate an in-focus background object 810 occluded by an out-of-focus foreground object 820. FIG. 8A illustrates the objects 810 and 820 prior to performing depth-of-field corrections: both objects appear in focus. FIG. 8B illustrates the artifact that occurs if the depth-of-field corrections are not properly performed. As illustrated, the object 820 has a blurred interior 824 and blurred edges 822. However, rather than blurring from the foreground object 820 to the background object 810, which is what would be expected, the exterior of edges 826 bordering the foreground object 810 appear sharp, while the interior of edges 826 appear blurred. The artifact results from a sharp transition from looking up a texture value from a lower resolution mip map to looking up a texture value from a higher resolution mip map at the border between object 810 and 820.

Figure 8C:
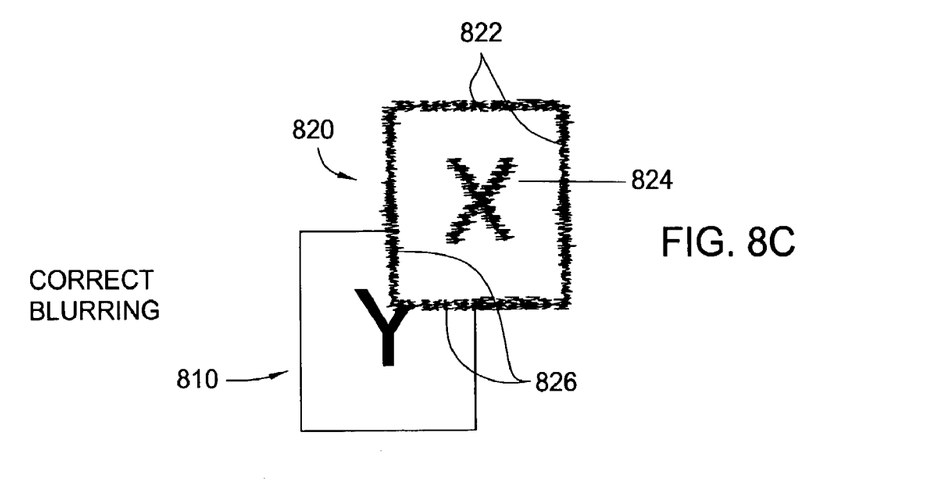

FIG. 8C illustrates correct blurring of the foreground object 810 into the background object 820, with the edges 824 correctly appearing blurred, with no sharp edges. It should be noted that this artifact does not occur when blurring an out-of-focus background object into an in-focus foreground object. In other words, it is correct (i.e., natural) for out-of-focus foreground objects to bleed into in-focus background objects, but not for out-of-focus background objects to bleed into in-focus foreground objects. Therefore, this artifact may be removed by blurring out-of-focus foreground objects into in-focus background objects.

Figure 9:
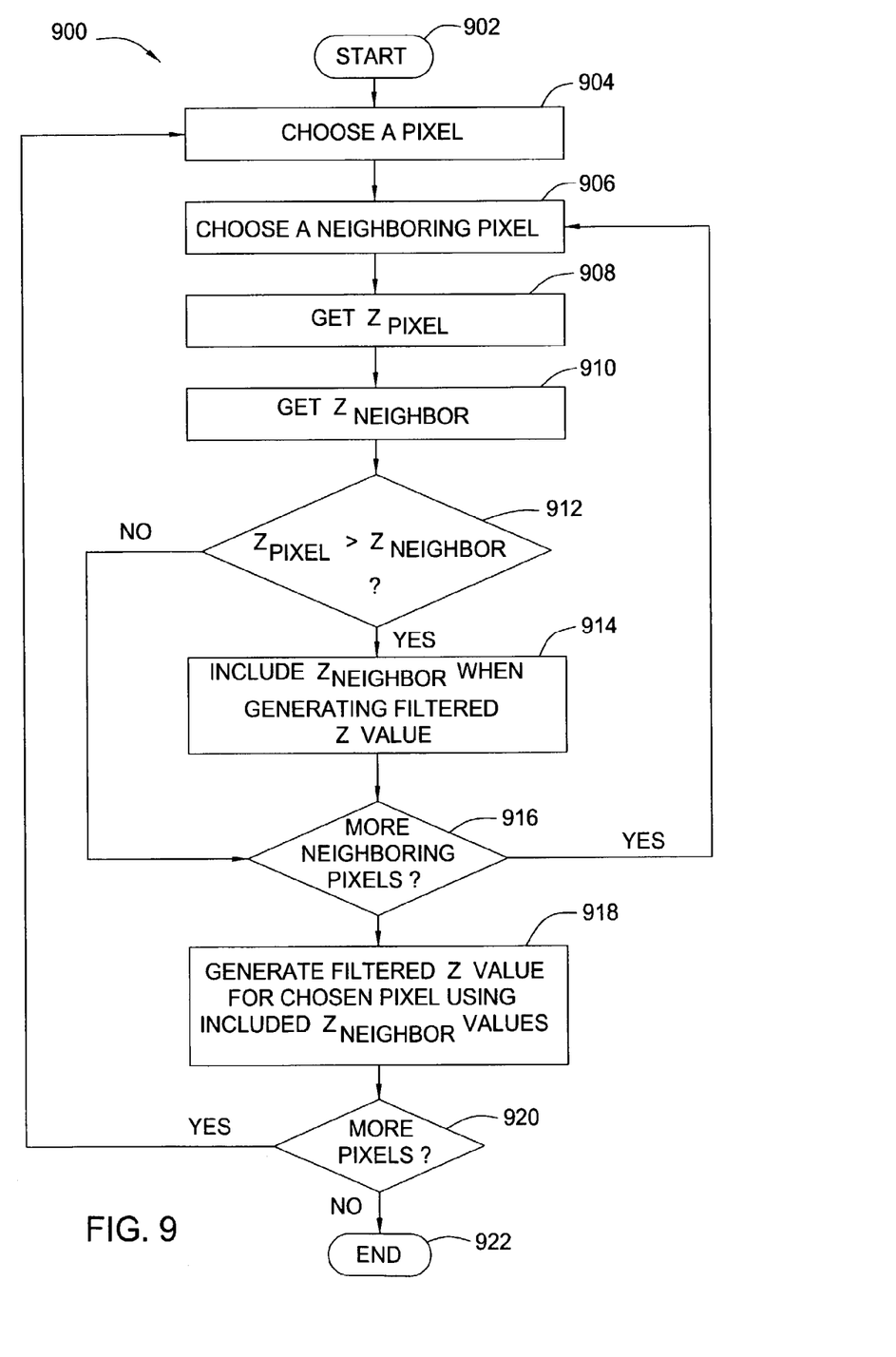
FIG. 9 illustrates exemplary operations for filtering depth values according to one or more aspects of the present invention.

FIG. 9 illustrates exemplary operations of a method 900 for filtering depth values, which may result in the proper blurring of an out-of-focus foreground object into an out-of-focus background object. The method generally includes filtering depth values of chosen pixels by blending in depth values of neighboring pixels only if they appear in the foreground relative to the chosen pixel, thus allowing foreground objects to "bleed" into background objects.

The method 900 may be performed for each pixel, after capturing the depth values. The method begins at step 902. At step 904, a pixel is chosen. Steps 906–916 are performed for each neighboring pixel. A neighboring pixel may refer to any pixel surrounding the chosen pixel in a neighboring range. The neighboring range may be chosen, for example, to optimize performance or image quality. In other words, the size of the neighboring range may determine a number of loops through steps 906–916 are required. For some embodiments, the predefined neighboring range may include only pixels immediately surrounding the chosen pixel (i.e., a 3×3 range of pixels). However, for other embodiments, the neighboring range may be larger than 3×3 pixels.

At step 906, a neighboring pixel is chosen. At step 908, a depth value ($Z_{pixel}$) is retrieved for the chosen pixel. At step 910, a depth value ($Z_{neighbor}$) is retrieved for the neighboring pixel. At step 912, if the depth value of the neighboring pixel is less than the depth value of chosen pixel (i.e., the neighboring pixel is in the foreground relative to the chosen pixel), the depth value of the neighboring pixel is included when generating a filtered depth value of the chosen pixel. Otherwise, the depth value of the neighboring pixel is not included, correctly preventing background objects from blurring into foreground objects.

At step 916, if there are more neighboring pixels, steps 906–914 are repeated. Otherwise, a filtered depth value for the chosen pixel is generated at step 918 using the depth values of the neighboring pixels included at step 914. If there are more pixels at step 920, steps 904–918 may be repeated. Otherwise, the method is terminated at step 922.

Depth values included in the filtering may be simply accumulated at step 914. Accordingly, the filtering operation of step 918 may include an operation to normalize the generated filtered depth value. Further, any suitable filtering operation may be performed at step 918 to generate the filtered depth value.

Figure 10:
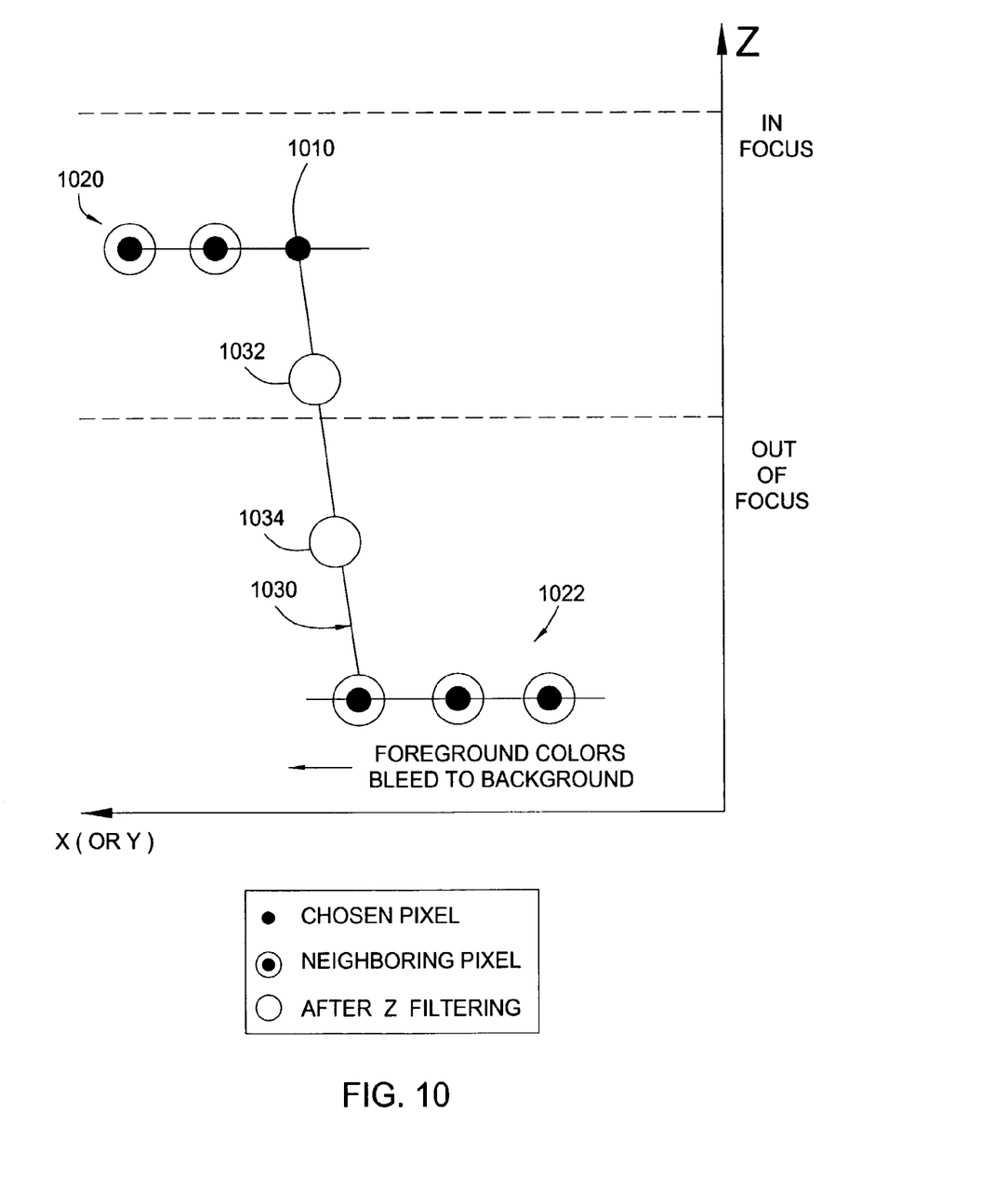
FIG. 10 illustrates results of filtering depth values according to the exemplary operations of FIG. 9.

FIG. 10 illustrates the effect of the filtering operations of FIG. 9. In FIG. 10, the vertical (Z) axis represents a pixel depth, the horizontal axis represents a pixel position, and pixel 1010 represents a chosen pixel. Neighboring pixels 1020 at a same depth as the chosen pixel 1010 are not included in the filtering operation. However, neighboring pixels 1022 at a lesser depth (i.e., in the foreground with respect to the chosen pixel 1010) are included in the filtering operation. The filtered depth value will be along a line 1030 between the depth value of the chosen pixel 1010 and depth values of the neighboring pixels 1022.

Pixels 1032 and 1034 represent exemplary pixels having the filtered depth value, which may depend on the weighting of a filtering function used to filter the foreground neighboring pixels 1022 with the chosen pixel 1010. For example, given a first weighting function, the resultant filtered depth value may be that of pixel 1032. However, as illustrated, the filtered depth value of pixel 1032 may be in-focus, which may result in the undesirable sharp edge artifact illustrated in FIG. 8B. Therefore, for some embodiments, a second weighting function may be used giving a greater weight to the depth values of the foreground neighboring pixels 1022, resulting in the filtered depth value of pixel 1034 (i.e., closer to the depth values of the foreground pixels 1022) which is out-of-focus. For example, the second filtering function may give a weight to depth values of foreground neighboring pixels 1022 that is proportional to twice the difference between the depth value of the chosen pixel 1010 and depth values of the foreground neighboring pixels 1022.

APPLICATION PROGRAMMING INTERFACE

Referring back to FIG. 2, for some embodiments, the application programming interface (API) 220 may allow an application program 210 to specify depth-of-field corrections to be performed on an image rendered by the GPU 230. For example, the application program 210 may pass a 3D field of view to the API for display by the GPU 230, as well as various parameters that specify an amount or type of depth-of-field corrections to perform.

For example, the application program 210 may pass the API 220, a single quality parameter having a value between 0 and 1, with 0 corresponding to a poorest quality. In other words, if the application program 210 passes the API 220 a quality parameter with a value of 0, a final scene may be rendered with no depth-of-field corrections. Alternatively, if the API is called with a value of 1 for the quality parameter, the final scene may be rendered utilizing a combination of the depth-of-field correction methods described above (e.g., multiple texture lookups, z-value filtering, etc.). The application program 210 may also pass other parameters to the API 220 to enable/disable individual depth-of-field correction features, such as pre-filtering the z-buffer, blurring the z-buffer, and generating multiple texture coordinates for multiple texture lookups.

Accordingly, embodiments of the present invention may provide methods and systems for performing depth-of-field corrections when rendering a three-dimensional (3D) image of a scene having in-focus and out-of-focus regions on a two-dimensional (2D) screen region of pixels. The depth-of-field corrections may result in out-of-focus objects appearing blurred relative to in-focus objects, which may add realism and enhance the quality of the rendered scene.

While the foregoing is directed to embodiments of the present invention, other and further embodiments of the invention may be devised without departing from the basic scope thereof, and the scope thereof is determined by the claims that follow. In the claims, the listed order of method steps do not imply any order to the performance of the steps, unless specifically stated in the claim.

What is claimed is:

1. A method for rendering a three-dimensional (3D) scene generated in a field of view having in-focus and out-of-focus regions on a two-dimensional (2D) screen region of pixels, the method comprising the steps of:

initially rendering the scene to create a color texture map and a depth texture map;

creating mip-map layers for the color texture map; and subsequently rendering the scene by, for each pixel:
creating a mip-map layer selection value as a function of a depth of the pixel from the depth texture map,
generating a color value by interpolation using color values from at least one of the mip-map layers chosen according to the mip-map layer selection value, and
setting a color of the pixel to the generated color value,
wherein the mip-map layers for the color texture map have a one-dimensional coordinate spacing of $2^N/S$, where N is a mip-map level and S is the corresponding one-dimensional number of pixels on the screen.

2. The method of claim 1, wherein the generating comprises trilinear interpolation using color values from mip-map layers above and below the mip-map layer selection value.

3. The method of claim 1, wherein the field of view has more than one in-focus region.

4. The method of claim 1, wherein the mip-map layers for the color texture map are created using a symmetrical kernel filter larger than 2×2 texels.

5. The method of claim 1, wherein the screen region comprises less than a full portion of the screen.

6. The method of claim 1, wherein creating the mip-map layer selection value as a function of a depth of the pixel comprises looking up a value from a lookup table.

7. A method for rendering a three-dimensional (3D) scene generated in a field of view having in-focus and out-of-focus regions on a two-dimensional (2D) screen region of pixels, the method comprising the steps of:
initially rendering the scene to create a color texture map and a depth texture map;
creating mip-map layers for the color texture map; and
subsequently rendering the scene by, for each pixel:
determining, within a set of neighboring pixels, which neighboring pixels are in the foreground with reference to the pixel,
generating a filtered depth value of the pixel by blending, from the depth texture map, a depth value of the pixel with depth values of neighboring pixels determined to be in the foreground with reference to the pixel,
creating a mip-map layer selection value as a function of the filtered depth value of the pixel,
generating a color value by interpolation using color values from mip-map layers above and below the mip-map layer selection value, and
setting a color of the pixel to the generated color value.

8. The method of claim 7, wherein blending the depth value of the pixel with the depth values of neighboring pixels determined to be in the foreground with reference to the pixel comprises applying a blending function that weights depth values of nearer pixels, with reference to the foreground, more heavily than farther pixels.

9. The method of claim 8, wherein the set of neighboring pixels includes only neighboring pixels immediately surrounding the pixel.

10. The method of claim 8, wherein the set of neighboring pixels is larger in size than a 3×3 set of pixels.

11. A method for rendering a three-dimensional (3D) scene generated in a field of view having in-focus and out-of-focus regions on a two-dimensional (2D) screen region of pixels, the method comprising the steps of:
initially rendering the scene to create a color texture map and a depth texture map;
creating mip-map layers for the color texture map; and
subsequently rendering the final scene by, for each pixel:
creating a mip-map layer selection value as a function of a depth of the pixel from the depth texture map,
creating a set of texture coordinates,
generating color values for the set of texture coordinates by interpolation using color values from at least one of the mip-map layers chosen according to the mip-map layer selection value,
generating a color value for the pixel by blending together the color values generated for the set of texture coordinates, and
setting a color of the pixel to the generated color value,
wherein creating a set of texture coordinates comprises creating a set of texture coordinates from a single texture coordinate, and
wherein a spacing of the set of texture coordinates is chosen according to the mip-map layer selection value.

12. The method of claim 11, wherein generating color values for the set of texture coordinates comprises trilinear interpolation using color values from mip-map layers above and below the mip-map layer selection value.

13. A method for rendering a three-dimensional (3D) scene generated in a field of view having in-focus and out-of-focus regions on a two-dimensional (2D) screen region of pixels, the method comprising the steps of:
initially rendering the scene to create a color texture map and a depth texture map;
creating mip-map layers for the color texture map; and
subsequently rendering the final scene by, for each pixel:
creating a mip-map layer selection value as a function of a depth of the pixel from the depth texture map,
creating a set of texture coordinates,
generating color values for the set of texture coordinates by interpolation using color values from at least one of the mip-map layers chosen according to the mip-map layer selection value,
generating a color value for the pixel by blending together the color values generated for the set of texture coordinates, and
setting a color of the pixel to the generated color value,
wherein creating a set of texture coordinates comprises creating a set of texture coordinates from a single texture coordinate, and
wherein the set of texture coordinates forms a symmetrical pattern surrounding the single texture coordinate.

14. The method of claim 13, wherein the set of texture coordinates forms a diamond pattern, wherein each of the set of texture coordinates is offset from the single texture coordinate by an equal offset distance.

15. The method of claim 13, wherein blending together the color values generated for the set of texture coordinates comprises blending the color values using a weighted blending function.

16. A method for rendering a three-dimensional (3D) scene generated in a field of view having in-focus and out-of-focus regions on a two-dimensional (2D) screen region of pixels, the method comprising the steps of:
initially rendering the scene to create a color texture map and a depth texture map;
creating mip-map layers for the color texture map; and
subsequently rendering the scene by, for each pixel:
determining, within a set of neighboring pixels, which neighboring pixels are in the foreground with reference to the pixel,
generating a filtered depth value of the pixel by blending, from the depth texture map, a depth value of the pixel with depth values of neighboring pixels determined to be in the foreground with reference to the pixel, creating a mip-map layer selection value as a function of the filtered depth value of the pixel, creating a set of texture coordinates, generating color values for the set of texture coordinates by interpolation using color values from mip-map layers above and below the mip-map layer selection value, generating a color value for the pixel by blending together the color values generated for the set of texture coordinates, and setting a color of the pixel to the generated color value.

17. The method of claim 16, wherein blending a depth value of the pixel with depth values of neighboring pixels determined to be in the foreground with reference to the pixel comprises applying a blending function that weights depth values of nearer pixels, with reference to the foreground, more heavily than farther pixels.

18. The method of claim 16, wherein generating a filtered depth value of the pixel by blending a depth value of the pixel with depth values of neighboring pixels determined to be in the foreground with reference to the pixel comprises blending only neighboring pixels immediately surrounding the pixel.

19. A method for rendering a three-dimensional (3D) scene generated by an application program on a two-dimensional (2D) screen region of pixels, the 3D scene generated in a field of view having in-focus and out-of-focus regions, the method comprising the steps of:

providing an application program interface (API) to interface with a graphics processor;

receiving the 3D scene by the API from the application program; and passing the 3D scene to the graphics processor from the API, wherein the graphics processor is configured to:

initially render the scene to create a color texture map and a depth texture map;

create mip-map layers for the color texture map; and subsequently render the scene by, for each pixel:

creating a mip-map layer selection value as a function of a depth of the pixel from the depth texture map, generating a color value by interpolation using color values from at least one of the mip-map layers chosen according to the mip-map layer selection value, and setting a color of the pixel to the generated color values, wherein the application program passes the API a parameter to configure the graphics processor to apply a filtering function to filter depth values of the depth texture map prior to rendering the scene, and wherein the filtering function generates a filtered depth value for a pixel by blending a depth value of the pixel with depth values of only neighboring pixels determined to be in the foreground with reference to the pixel.

20. A method for rendering a three-dimensional (3D) scene generated by an application program on a two-dimensional (2D) screen region of pixels, the 3D scene generated in a field of view having in-focus and out-of-focus regions, the method comprising the steps of:

providing an application program interface (API) to interface with a graphics processor;

receiving the 3D scene by the API from the application program; and passing the 3D scene to the graphics processor from the API, wherein the graphics processor is configured to:

initially render the scene to create a color texture map and a depth texture map;

create mip-map layers for the color texture map; and subsequently render the scene by, for each pixel:

creating a mip-map layer selection value as a function of a depth of the pixel from the depth texture map, generating a color value by interpolation using color values from at least one of the mip-map layers chosen according to the mip-map layer selection value, and setting a color of the pixel to the generated color value, wherein the application program passes the API a parameter to configure the graphics processor to, for each pixel, generate a set of texture coordinates, generate color values for the set of texture coordinates using color values from at least one of the mip-map layers chosen according to the mip-map layer selection value, generate a color value for the pixel by blending together the color values generated for the set of texture coordinates, and set the color of the pixel to the generated color value.

21. A computer-readable medium containing a program which, when executed by a processor, performs operations for rendering a three-dimensional (3D) scene generated in a field of view having in-focus and out-of-focus regions on a two-dimensional (2D) screen region of pixels, the operations comprising:

initially rendering the scene to create a color texture map and a depth texture map;

creating mip-map layers for the color texture map; and subsequently rendering the scene by, for each pixel:

creating a mip-map layer selection value as a function of a depth of the pixel from the depth texture map, generating a color value by interpolation using color values from at least one of the mip-map layers chosen according to the mip-map layer selection value, and setting a color of the pixel to the generated color values, wherein subsequently rendering the scene further comprises, for each pixel:

determining, within a set of neighboring pixels, which neighboring pixels are in the foreground with reference to the pixel, generating a filtered depth value of the pixel by blending, from the depth texture map, a depth value of the pixel with depth values of neighboring pixels determined to be in the foreground with reference to the pixel, and creating a mip-map layer selection value as a function of the filtered depth value of the pixel.

22. The computer-readable medium of claim 21, wherein the generating comprises trilinear interpolation using color values from mip-map layers above and below the mip-map layer selection value.

23. The computer-readable medium of claim 21, wherein the mip-map layers for the color texture map are created using a symmetrical kernel filter larger than 2×2 texels.

24. The computer-readable medium of claim 21, wherein creating the mip-map layer selection value as a function of a depth of the pixel comprises looking up a value from a lookup table.

25. The computer-readable medium of claim 21, wherein the operations further comprise applying a filtering function to filter depths of the depth texture map, and wherein creating the mip-map layer selection value comprises creating the mip-map layer selection value as a function of a filtered depth of the pixel from the depth texture map.

26. The computer-readable medium of claim 25, wherein the filtering function has a filtering kernel larger than 2×2 texels.

27. The computer-readable medium of claim 26, wherein the filtering kernel is symmetrical.

28. The computer-readable medium of claim 21, wherein the set of neighboring pixels is larger in size than a 3×3 set of pixels.

29. The computer-readable medium of claim 21, wherein generating a color value by interpolation using color values from at least one of the mip-map layers chosen according to the mip-map layer selection value comprises:

creating a set of texture coordinates;

generating color values for the set of texture coordinates by interpolation using color values from at least one of the mip-map layers chosen according to the mip-map layer selection value; and generating a color value for the pixel by blending together the color values generated for the set of texture coordinates.

30. The computer-readable medium of claim 29, wherein generating color values for the set of texture coordinates comprises trilinear interpolation using color values from mip-map layers above and below the mip-map layer selection value.

31. The computer-readable medium of claim 29, wherein creating a set of texture coordinates comprises creating a set of texture coordinates from a single texture coordinate.

32. The computer-readable medium of claim 29, wherein blending together the color values generated for the set of texture coordinates comprises blending the color values using a weighted blending function.

33. The computer-readable medium of claim 29, wherein the operations further comprise applying a filtering function to filter depth values of the depth texture map and wherein creating a mip-map layer selection value comprises creating a mip-map layer selection value as a function of a filtered depth value of the pixel from the depth texture map.

34. The computer-readable medium of claim 33, wherein the filtering function has a filter kernel larger in size than 2×2 texels.

35. A computer system comprising:

a processor; and a storage medium containing a program which, when executed by the processor, performs operations for rendering a three-dimensional (3D) scene generated in a field of view having in-focus and out-of-focus regions on a two-dimensional (2D) screen region of pixels, the operations comprising initially rendering the scene to create a color texture map and a depth texture map, creating mip-map layers for the color texture map, and subsequently rendering the scene by, for each pixel:

creating a mip-map layer selection value as a function of a depth of the pixel from the depth texture map, generating a color value by interpolation using color values from at least one of the mip-map layers chosen according to the mip-map layer selection value, and setting a color of the pixel to the generated color values, wherein subsequently rendering the scene further comprises, for each pixel:

determining, within a set of neighboring pixels, which neighboring pixels are in the foreground with reference to the pixel, generating a filtered depth value of the pixel by blending, from the depth texture map, a depth value of the pixel with depth values of neighboring pixels determined to be in the foreground with reference to the pixel, and creating a mip-map layer selection value as a function of the filtered depth value of the pixel.

36. The computer system of claim 35, wherein the generating comprises trilinear interpolation using color values from mip-map layers above and below the mip-map layer selection value.

37. The computer system of claim 35, wherein the operations further comprise applying a filtering function to filter depths of the depth texture map, and wherein creating the mip-map layer selection value comprises creating the mip-map layer selection value as a function of a filtered depth of the pixel from the depth texture map.

38. The computer system of claim 35, wherein generating a color value by interpolation using color values from at least one of the mip-map layers chosen according to the mip-map layer selection value comprises:

creating a set of texture coordinates;

generating color values for the set of texture coordinates by interpolation using color values from at least one of the mip-map layers chosen according to the mip-map layer selection value; and generating a color value for the pixel by blending together the color values generated for the set of texture coordinates.

39. The computer system of claim 38, wherein creating a set of texture coordinates comprises creating a set of texture coordinates from a single texture coordinate.

40. The computer system of claim 38, wherein the operations further comprise applying a filtering function to filter depth values of the depth texture map and wherein creating a mip-map layer selection value comprises creating a mip-map layer selection value as a function of a filtered depth value of the pixel from the depth texture map.

* * * * *